(12) United States Patent
Kim et al.

(10) Patent No.: US 7,436,813 B2
(45) Date of Patent: Oct. 14, 2008

(54) METHOD AND SYSTEM FOR ACQUIRING TIME SYNCHRONIZATION BETWEEN BASE STATIONS IN A BROADBAND WIRELESS ACCESS COMMUNICATION SYSTEM

(75) Inventors: Jun-Hyung Kim, Seoul (KR);
Jun-Hyuk Song, Anyang-si (KR);
Geun-Hwi Lim, Seongnam-si (KR);
Hong-Sung Chang, Suwon-si (KR);
Yong Chang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 308 days.

(21) Appl. No.: 11/204,599

(22) Filed: Aug. 16, 2005

(65) Prior Publication Data

US 2006/0034250 A1 Feb. 16, 2006

(30) Foreign Application Priority Data

Aug. 16, 2004 (KR) .................. 10-2004-0064462

(51) Int. Cl.
*H04J 3/06* (2006.01)
*H04B 7/00* (2006.01)
*H04B 7/212* (2006.01)
*H04B 15/00* (2006.01)
*H04L 7/00* (2006.01)

(52) U.S. Cl. .............. 370/350; 370/310; 370/324; 370/503; 455/502; 375/356

(58) Field of Classification Search ......... 370/310, 370/324, 350, 503; 455/502; 375/356
See application file for complete search history.

(56) References Cited

U.S. PATENT DOCUMENTS

| | | | | |
|---|---|---|---|---|
| 4,939,752 A | * | 7/1990 | Literati et al. ............ 370/238 |
| 5,448,570 A | * | 9/1995 | Toda et al. ............... 370/337 |
| 5,519,759 A | * | 5/1996 | Heineck et al. ........... 455/422.1 |
| 5,528,597 A | * | 6/1996 | Gerszberg et al. ........... 370/347 |
| 5,537,685 A | * | 7/1996 | Matsuno ............... 455/502 |
| 5,613,211 A | * | 3/1997 | Matsuno ............... 455/502 |
| 5,699,388 A | * | 12/1997 | Wang et al. .............. 375/356 |
| 6,590,881 B1 | * | 7/2003 | Wallace et al. ............ 370/332 |
| 6,847,826 B1 | | 1/2005 | Wesby et al. ............. 455/502 |
| 6,907,224 B2 | | 6/2005 | Younis ............... 455/12.1 |
| 7,117,067 B2 | | 10/2006 | McLurkin et al. .......... 700/245 |
| 7,151,757 B2 | | 12/2006 | Beasley et al. ............ 370/331 |

(Continued)

FOREIGN PATENT DOCUMENTS

JP 11205849 A * 7/1999

*Primary Examiner*—Lester Kincaid
*Assistant Examiner*—Nathan Mitchell
(74) *Attorney, Agent, or Firm*—The Farrell Law Firm, PC (57) ABSTRACT

Method and system by which a base station without a Global Positioning System (GPS) receiver acquires time synchronization in a Broadband Wireless Access (BWA) communication system. The method includes scanning neighbor base stations around a first base station and requesting time synchronization information from the scanned neighbor base stations by the first base station; receiving responses from predetermined neighbor base stations having already acquired time synchronization from among the neighbor base stations, the responses including time synchronization information of the predetermined neighbor base stations; and selecting a second base station from among the predetermined neighbor base stations and acquiring time synchronization based on the time synchronization information of the second base station.

24 Claims, 5 Drawing Sheets

U.S. PATENT DOCUMENTS

| | | | |
|---|---|---|---|
| 7,155,244 B2 | 12/2006 | Edge | 455/502 |
| 2002/0012362 A1* | 1/2002 | Yahata et al. | 370/503 |
| 2002/0177460 A1* | 11/2002 | Beasley et al. | 455/502 |
| 2002/0187749 A1* | 12/2002 | Beasley et al. | 455/41 |
| 2003/0007471 A1* | 1/2003 | Terasawa et al. | 370/335 |
| 2003/0174666 A1* | 9/2003 | Wallance et al. | 370/324 |
| 2004/0032836 A1 | 2/2004 | Grilli et al. | 370/252 |
| 2005/0037786 A1 | 2/2005 | Edge | 455/502 |
| 2006/0034250 A1 | 2/2006 | Kim et al. | 370/350 |

* cited by examiner

METHOD AND SYSTEM FOR ACQUIRING TIME SYNCHRONIZATION BETWEEN BASE STATIONS IN A BROADBAND WIRELESS ACCESS COMMUNICATION SYSTEM

PRIORITY

This application claims priority to an application entitled "Method And System For Acquiring Time Synchronization Between Base Stations In A Broadband Wireless Access Communication System" filed in the Korean Industrial Property Office on Aug. 16, 2004 and assigned Serial No. 2004-64462, the contents of which are incorporated herein by reference.

BACKGROUND OF THE INVENTION

1. Field of the Invention

The present invention relates to a method and system for time synchronization in a Broadband Wireless Access (BWA) communication system, and more particularly to a method and system for time synchronization between Base Stations (BSs) in a BWA communication system.

2. Description of the Related Art

The existing communication networks for providing common mobile communication services have been developed mainly in order to provide voice service and thus can transmit a relatively small quantity of data. Therefore, in comparison with other types of wireless communication systems, the mobile communication systems for providing voice communication services, as described above, have a relatively smaller bandwidth. Nowadays, the necessity for a communication system capable of efficiently providing Internet service is increasing due to users' increasing demand for the Internet service together with developments in the communication industry. However, the communication networks, developed mainly in order to provide the voice service, require relatively expensive charges for services requiring a large quantity of data, such as Internet service, because the communication networks mainly for the voice service have a relatively smaller transmission bandwidth.

In this regard, Institute of Electrical and Electronics Engineers (IEEE) 802.16 standardization group, which is an international standardization organization, is now driving to establish an IEEE 802.16d standard for providing a broadband wireless Internet service to a stationary subscriber station. A BWA system according to the IEEE 802.16d standard has a wider bandwidth for data transmission and thus can transmits a much larger quantity of data in short time, in comparison with the conventional wireless technology for voice service. Further, in the BWA system according to the IEEE 802.16d standard, all users can share a channel, thereby achieving efficient use of the channel.

In the BWA system, all users connected to a BS share a common channel and the BS allocates intervals of the common channel for use of each user at every uplink and downlink frame. Therefore, the BS must inform uplink and downlink access information to the users every frame in order to enable the users to share the channel. In the BWA system, access information includes uplink access information and downlink access information, and a MAP message containing the uplink access information or downlink access information is inserted to a front portion of each frame transmitted to the users. The MAP message includes various types of MAP information elements.

Meanwhile, the efficiency in using the frequency band in the BS is based on the frequency reuse rate. Therefore, it is necessary to make the frequency reuse ratio approach '1' in order to increase the efficiency of using the frequency band. In order make the frequency reuse ratio approach '1', it is necessary to achieve exact time synchronization between the BSs. Usually, a separate apparatus for time synchronization between all BSs is used in order to achieve exact time synchronization between the BSs. For example, each BS may be equipped with a Global Positioning System (GPS) receiver for receiving a GPS signal in order to achieve the time synchronization between the BSs, that is, in order to acquire time synchronization. Further, a BS equipped without such a GPS receiver can acquire time synchronization from another BS which has already acquired time synchronization.

However, when a BS without a GPS receiver performs time synchronization with another BS which has already acquired time synchronization with or without a GPS receiver, there has been no disclosed method for confirming if the time synchronization information transmitted from the another BS is available. A GPS signal transmitted from a GPS transmitter includes time synchronization information. A BS equipped with a GPS receiver acquires time synchronization directly from time synchronization information included in the GPS signal and then transmits time synchronization information corresponding to the acquired time synchronization to other BSs requiring acquisition of time synchronization. If another BS can use the transmitted time synchronization information within an available time range in order acquire time synchronization, it can be then said that the transmitted time synchronization information is available. Time synchronization information received by other BSs after passage of the available time range is not available.

Therefore, no problem with availability exists in a BS equipped with a GPS receiver and receiving a GPS signal directly from the GPS transmitter, because the BS can perform exact time synchronization by using the time synchronization information included in the directly received GPS signal. However, when a BS without a GPS receiver performs time synchronization with another BS having already acquired time synchronization without a GPS receiver, the BS performs the time synchronization without confirming the availability of the received time synchronization information. Therefore, it is impossible to recognize if the time synchronization has been performed precisely. That is, it is impossible to recognize if the time synchronization has been acquired based on exact time synchronization information provided by a BS having a certified availability. As such, it has been impossible to guarantee reliability in the acquisition of time synchronization between BSs.

SUMMARY OF THE INVENTION

Accordingly, the present invention has been made to solve the above-mentioned problems occurring in the prior art, and an object of the present invention is to provide a method and system by which a BS without a GPS receiver acquires time synchronization in a BWA communication system.

It is another object of the present invention to provide a method and system by which a BS, having already acquired time synchronization and requiring re-acquisition of time synchronization, acquires time synchronization in a BWA communication system.

It is another object of the present invention to provide a method and system by which a BS acquires time synchronization from certified time synchronization information in a BWA communication system.

It is another object of the present invention to provide a method and system by which a BS having already acquired time synchronization provides available time synchronization information to another BS requiring acquisition of time synchronization information in a BWA communication system.

In order to accomplish this object, there is provided a method for acquiring time synchronization by a first base station in a broadband wireless access communication system including a plurality of base stations which include certain base stations having already acquired time synchronization and a first base station requiring acquisition of time synchronization, the method including the steps of scanning neighbor base stations around the first base station and requesting time synchronization information from the scanned neighbor base stations by the first base station; receiving responses from predetermined neighbor base stations having already acquired time synchronization from among the neighbor base stations, the responses including time synchronization information of the predetermined neighbor base stations; and selecting a second base station from among the predetermined neighbor base stations and acquiring time synchronization based on the time synchronization information of the second base station.

In accordance with another aspect of the present invention, there is provided a method for supporting acquisition of time synchronization of a first base station by a second base station in a broadband wireless access communication system including a plurality of base stations which include certain base stations having already acquired time synchronization and the first base station requiring acquisition of time synchronization, the second base station being one of the certain base stations and located adjacently to the first base station, the method including the steps of receiving a time synchronization information request message from the first base station by the second base station; and transmitting a response message including time synchronization information of the second base station to the first base station in response to the time synchronization information request message, so that the first base station can acquire time synchronization with the second base station.

In accordance with another aspect of the present invention, there is provided a method for acquiring time synchronization by a first base station in a broadband wireless access communication system including a plurality of base stations which include certain base stations having already acquired time synchronization and a first base station requiring acquisition of time synchronization, the method including the steps of scanning neighbor base stations around the first base station and requesting time synchronization information from the scanned neighbor base stations by the first base station; receiving responses from predetermined neighbor base stations having already acquired time synchronization from among the neighbor base stations, the responses including time synchronization information of the predetermined neighbor base stations, passed base station information and certificate information; determining availability of the received time synchronization information based on the certificate information and comparing the passed base station information based on the determined availability; and selecting a second base station from among the predetermined neighbor base stations based on the comparison and acquiring time synchronization based on the time synchronization information of the second base station.

In accordance with another aspect of the present invention, there is provided a method for supporting acquisition of time synchronization of a first base station by a second base station in a broadband wireless access communication system including a plurality of base stations which include certain base stations having already acquired time synchronization and the first base station requiring acquisition of time synchronization, the second base station being one of the certain base stations and located adjacently to the first base station, the method including the steps of receiving a time synchronization information request message from the first base station by the second base station; and transmitting a response message including time synchronization information of the second base station, passed base station information and certificate information to the first base station in response to the time synchronization information request message, so that the first base station can acquire time synchronization with the second base station.

In accordance with another aspect of the present invention, there is provided a system for acquiring time synchronization by a first base station in a broadband wireless access communication system including a plurality of base stations which include certain base stations having already acquired time synchronization and the first base station requiring acquisition of time synchronization, the system including the first base station for scanning neighbor base stations around the first base station, requesting time synchronization information from the scanned neighbor base stations, receiving responses from predetermined neighbor base stations having already acquired time synchronization from among the neighbor base stations, selecting a second base station from among the predetermined neighbor base stations, and acquiring time synchronization based on the time synchronization information of the second base station, the responses including time synchronization information of the predetermined neighbor base stations; and the second base station for, in response to the request for the time synchronization information from the first base station, transmitting a response message including time synchronization information of the second base station to the first base station, so that the first base station can acquire time synchronization with the second base station.

In accordance with another aspect of the present invention, there is provided a system for acquiring time synchronization by a first base station in a broadband wireless access communication system including a plurality of base stations which include certain base stations having already acquired time synchronization and the first base station requiring acquisition of time synchronization, the system including the first base station for scanning neighbor base stations around the first base station, requesting time synchronization information from the scanned neighbor base stations by the first base station, receiving responses from predetermined neighbor base stations having already acquired time synchronization from among the neighbor base stations, determining availability of the received time synchronization information based on the certificate information, comparing the passed base station information based on the determined availability, selecting a second base station from among the predetermined neighbor base stations based on the comparison, and acquiring time synchronization based on the time synchronization information of the second base station, the responses including time synchronization information of the predetermined neighbor base stations, passed base station information and certificate information; and the second base station for, in response to the request for the time synchronization information from the first base station, transmitting a response message including the time synchronization information of the second base station, the passed base station information and the certificate information to the first base station, so that the first base station can acquire time synchronization with the second base station.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, a detailed description of known functions and configurations incorporated herein will be omitted when it may make the subject matter of the present invention unclear.

According to embodiments of the present invention, a Base Station (BS) requiring acquisition of time synchronization collects information necessary for time synchronization from adjacent BSs in a Broadband Wireless Access (BWA) communication system. The present invention proposes a method for acquiring time synchronization between BSs by using the collected time synchronization information. Here, the neighbor BSs are BSs having already acquired the time synchronization. For example, each of the neighbor BSs may be either a BS equipped with a Global Positioning System (GPS) receiver capable of receiving a GPS signal or a BS which has already acquired time synchronization from another BS without a GPS receiver.

In order to implement the embodiments of the present invention, it is necessary to define the format of MAP information elements necessary for acquiring time synchronization from neighbor BSs in a BWA communication system and functions of parameters included in the MAP information elements. A process for generating, receiving and processing such MAP information elements will be discussed. Further, a format of an efficient MAP information element having a low overhead will be defined. Moreover, a process for certified time synchronization by transmitting a hop-count and certificate profile while performing time synchronization between BSs will be also discussed.

Figure 1:
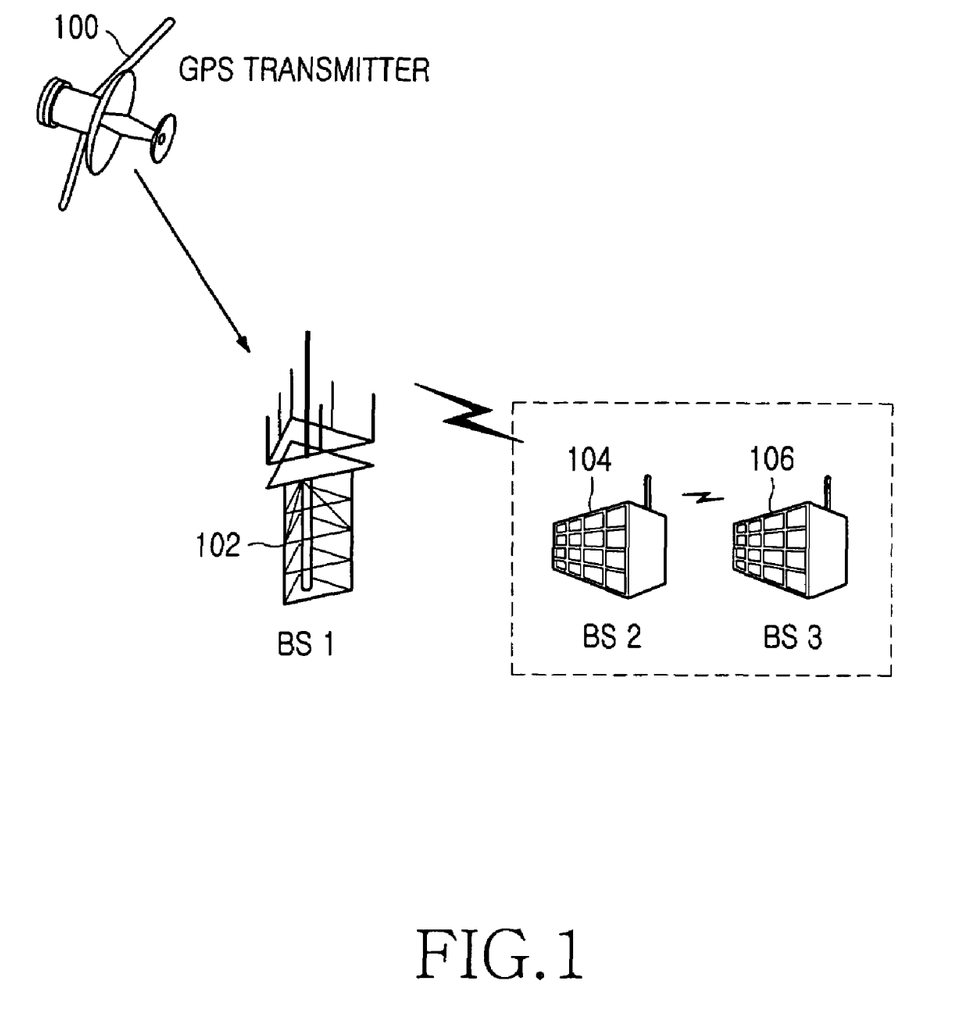
FIG. 1 illustrates a schematic structure of a BWA communication system according to an embodiment of the present invention.

FIG. 1 illustrates a schematic structure of a BWA communication system in which, a BS with a GPS receiver transmits time synchronization information to another BS which does not have a GPS receiver and requires acquisition of time synchronization information.

Referring to FIG. 1, a GPS transmitter 100 continuously transmits a GPS signal carrying time synchronization information. BS 1 102 has a GPS receiver for receiving the GPS signal and acquires time synchronization from the time synchronization information included in the GPS signal. The time synchronization information included in the GPS signal is information which indicates a current time point and serves as a reference when other BSs acquire the time synchronization. BS 1 102 is a BS which has a GPS receiver and is usually located outdoors. Therefore, BS 1 102 receives the GPS signal from the GPS transmitter 100 and performs time synchronization with the GPS signal by updating a clock used in the BS 1 102. That is, BS 1 102 acquires time synchronization based on the time synchronization information included in the received GPS signal. Further, in response to requests from other BSs (BS 2 & BS 3) 104 and 106 which have no GPS receiver, BS 1 102 transmits its own time synchronization information acquired based on the time synchronization information included in the received GPS signal. Although FIG. 1 shows only one BS equipped with a GPS receiver, the BWA communication system may include a plurality of BSs each equipped with a GPS receiver.

Further, BS 2 104 and BS 3 106 are BSs which have no GPS receiver and are usually located indoors. It is necessary for BS 2 104 and BS 3 106 to periodically perform time synchronization because they have no GPS receiver. Hereinafter, a process in which BS 2 104 from among the BSs having no GPS receiver performs and acquires time synchronization will be described. In the following description, it is assumed that BS 2 104 is in an initial stage after being turned on and performing a general initialization process and that BS 3 106 acquires time synchronization from the time synchronization information of BS 2 104 transmitted from BS 2 104, after BS 2 104 acquires the time synchronization information.

Then, BS 2 104 scans neighbor BSs. When one or more neighbor BSs are found by the scanning, BS 2 104 transmits a ranging request message requesting time synchronization information to the neighbor BSs including BS 1 102 and BS 3 106. Then, if the neighbor BSs receiving the ranging request message (i.e. BS 1 102 and BS 3 106) have already acquired time synchronization from the time synchronization information included in the GPS signal, they transmit a ranging response message to BS 2 104. The ranging response message transmitted to BS 2 104 includes the time synchronization information acquired by the neighbor BS itself (BS 1 102 or BS 3 106), a hop count and a certificate profile. The ranging request message and ranging response message will be described in more detail hereinafter with reference to Tables 1 and 2 below.

The hop count included in the ranging response message represents the number of BSs via which the time synchronization information provided by the GPS transmitter 100 have reached the BS which transmitted the ranging request message, that is, the BS which requires acquisition of the time synchronization. For example, when BS 1 102, which has already acquired time synchronization transmits time synchronization information to BS 2 104, the hop count included in the ranging response message is '1' because BS 1 102 received time synchronization directly from the GPS transmitter 100 by means of the GPS receiver. In other words, the hop count of '1' represents that the time synchronization information received by BS 2 104 has passed through only one BS before reaching BS 2 104 from the GPS transmitter 100. Further, when BS 2 104 acquired time synchronization from the time synchronization information transmitted by BS 1 102 transmits the time synchronization information to BS 3 106 which transmitted a ranging request message to BS 2 104, the hop count included in the ranging response message is '2'. In this way, the larger the number of BSs through which the time synchronization information from the GPS receiver passes before reaching a BS for acquiring the time synchronization is, the larger the hop count becomes.

Further, the certificate profile included in the ranging response message is transmitted together with the time synchronization information, in order to represent if the time synchronization information included in the ranging response message is available and if the time synchronization information is available for acquisition of time synchronization by a BS requiring acquisition of the time synchronization. Further, the certificate profile is generated by the BS which has received time synchronization information from the GPS transmitter 100 and has initially acquired time synchronization. The BS actually acquiring time synchronization information determines if the time synchronization information is available by checking the certificate profile included in the ranging response message. Thereafter, when the time synchronization information has been determined as available, the BS updates the clock based on the time synchronization information included in the ranging response message, thereby acquiring the time synchronization.

Further, when the certificate profiles included in the ranging response messages transmitted from the neighbor BSs are available, the BS receiving the ranging response messages compares the hop counts included in the ranging response messages and then performs synchronization with a BS having the smallest hop count from among the neighbor BSs. Therefore, when a plurality of neighbor BSs instead of only one BS (BS 1 102) around BS 2 104 have acquired time synchronization, BS 2 104 performs time synchronization with BS 1 102 which has the minimum hop count of '1', thereby acquiring time synchronization.

Through the process described above, BS 2 104 and BS 1 102 perform time synchronization based on the time synchronization information included in the GPS signal. That is, BS 1 102 and BS 2 104 acquire the same synchronization. Further, BS 3 106 acquires time synchronization from the time synchronization information transmitted by BS 2 104, which BS 2 104 had acquired as described above. Therefore, BS 3 106 acquires time synchronization corresponding to the time synchronization information included in the GPS signal. In other words, BS 1 102, BS 2 104 and BS 3 106 acquire the same time synchronization.

When a predetermined time interval has passed after BS 2 104 and BS 3 106 having no GPS receiver acquire time synchronization by using the time synchronization information included in the GPS signal, difference occurs between the time synchronization which BS 1 102 acquired from the time synchronization information included in the GPS signal which BS 1 102 directly received from the GPS transmitter, the time synchronization which BS 2 104 acquired from the time synchronization information transmitted from BS 1 102, and the time synchronization which BS 3 106 acquired from the time synchronization information transmitted from BS 2 104, that is, difference occurs between clocks of the BSs.

Therefore, BS 2 104 and BS 3 106 set up a predetermined period (hereinafter, referred to as "time synchronization period") and perform a process for acquiring time synchronization in accordance with the setup time synchronization period, thereby periodically updating the clocks. At the predetermined time synchronization period, the BS which will perform a process for acquiring time synchronization again selects a BS transmitting a ranging response message including the minimum hop count from among all neighbor BSs (including a neighbor BS with which the BS has been performing time synchronization) which transmit ranging response messages including available time synchronization information and performs time synchronization with the selected BS in order to acquire the time synchronization. As described above, by performing time synchronization with the BS having the smallest hop count, that is, by performing time synchronization based on the time synchronization information transmitted through the BS having the smallest hop count (i.e. the BS having the least transmission delay), it is possible to acquire exact time synchronization.

Information elements added to the ranging request message which a BS transmits to neighbor BSs in order to perform time synchronization and the ranging response message transmitted to the neighbor BSs in response to the ranging request message are shown in Tables 1 and 2.

TABLE 1

| Name | Type | Length | Value |
|---|---|---|---|
| Time Synchronization Hop Report Request | 21 | 1 | 1 |

TABLE 2

| Name | Type | Length | Value |
|---|---|---|---|
| Time Synchronization Hop Report Response | 21 | 1 | Number of synchronization hop form GPS synchronized BS |

Tables 1 and 2 show the format of additional information elements for acquisition of time synchronization between BSs proposed by the present invention. The information elements are additionally included in the conventional ranging messages as certificate profile TLV (Type, Length & Value) information as shown in Tables 1 and 2 for acquisition of time synchronization between BSs.

The information element of 'Time Synchronization Hop Report Request' included in the ranging request message as shown in Table 1 is information which requests the hop count of the time synchronization information which will be transmitted by the neighbor BSs having already acquired the time synchronization information. Therefore, only when the time synchronization information is necessary, the BS which wants to acquire time synchronization sets the value of the time synchronization hop report request information as '1', inserts the setup time synchronization hop report request information into the ranging request message, and then transmits the ranging request message to the neighbor BSs. In response to the ranging request message, the neighbor BSs transmit ranging response messages to the BS. In transmitting the ranging response message, each neighbor BS adds '1' to the hop count which the neighbor BS received from another neighbor BS with which the neighbor BS performed time synchronization, and inserts the time synchronization hop report response information as shown in Table 2 having the added hop count into the transmitted ranging response message. Therefore, from the time synchronization hop report response information, the BS which wants to acquire the time synchronization can recognize the number of BSs through which the time synchronization information transmitted from the GPS transmitter 100 has passed before reaching the BS.

Further, each of the transmitted ranging response messages transmitted from the neighbor BSs to the BS transmitted the ranging request message includes not only the information of hop count but also information of certificate profile which represents whether the time synchronization information used for acquisition of time synchronization by the BS transmitted the ranging request message can be used for update of the inner clock, that is, if the time synchronization information is available. The certificate profile has basic fields as shown in Table 3.

TABLE 3

| X.509 V3 field | Description |
| --- | --- |
| tbsCertificate.version | Indicates the X.509 certificate version. Always set to v3 (value of 2) |
| tbsCertificate.serialNumber | Unique integer the issuing CA assigns to the certificate. |
| tbsCertificate.signature | Object identifier (OID) and optional parameters defining algorithm used to sign the certificate. This field shall contain the same algorithm identifier as the signature Algorithm field below. |
| tbsCertificate.issuer | Distinguished Name of the CA that issued certificate. |
| tbsCertificate.validity | Specifies when the certificate becomes active and when it expires. |
| tbsCertificate.subject | Distinguished Name identifying the entity whose public key is certified in the subjectpublic key information field. |
| tbsCertificate.subjectPublicKeyInfo | Field contains the public key material (public key and parameters) and the identifier of the algorithm with which the key is used. |
| tbsCertificate.issuerUniqueID | Optional field to allow reuse of issuer name over time. |
| tbsCertificate.subjectUniqueID | Optional field to allow reuse of subject name over time. |
| tbsCertificate.extensions | The extension data. |
| signatureAlgorithm | OID and optional parameters defining algorithm used to sign the certificate. This field shall contain the same algorithm identifier as the signature field in tbsCertificate. |
| signatureValue | Digital signature computed upon the ASN.1 DER encoded tbsCertificate. |

The certificate profile shown in Table 3 uses the certificate standard of X.509 V3 field of the Internet Engineering Task Force (IETF) which will not be described in more detail because it is described in the IETF standard. The certificate profile is produced by the BS which has acquired time synchronization from the initial GPS signal and is included in the ranging response message in the form of certificate profile TLV information.

Hereinafter, a process in which a BS without a GPS receiver acquires time synchronization will be described with reference to FIG. 2, which illustrates a schematic structure of a BWA communication system for acquisition of time synchronization between a plurality of BSs. In the BWA communication system shown in FIG. 2, for acquisition of time synchronization, a BS with a GPS receiver transmits time synchronization information to another BS without a GPS receiver. Also, a BS having already acquired time synchronization without a GPS receiver transmits time synchronization information to another BS which has no GPS receiver and requires acquisition of time synchronization.

Figure 2:
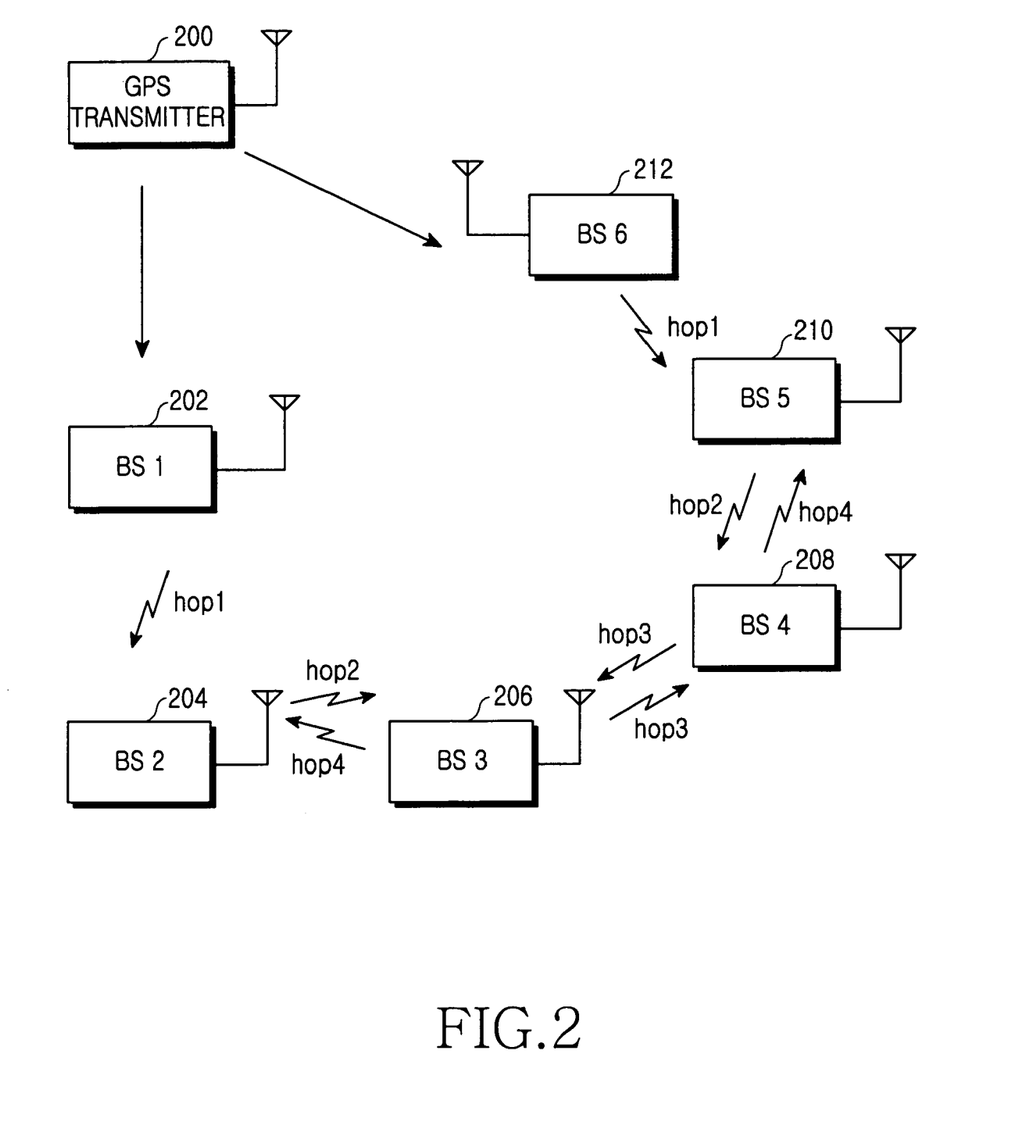
FIG. 2 illustrates a schematic structure of a BWA communication system for acquisition of time synchronization between a plurality of BSs according to another embodiment of the present invention.

Referring to FIG. 2, a GPS transmitter 200 continuously transmits a GPS signal including time synchronization information. BS 1 202 and BS 6 212 having a GPS receiver receive the GPS signal directly from the GPS transmitter 200 and acquire time synchronization from the time synchronization information included in the GPS signal. Meanwhile, the other BSs (including BS 2 204, BS 3 206, BS 4 208 and BS 5 210) than BS 1 202 and BS 6 212 do not have the GPS receiver and thus acquire time synchronization by scanning neighbor BSs and performing time synchronization with a neighbor BS that has already acquired time synchronization. Based on the scanned result, BS 2 204, BS 3 206, BS 4 208 and BS 5 210 transmit ranging request messages to neighbor BSs. In response to the ranging request messages, the neighbor BSs transmit ranging response messages to BS 2 204, BS 3 206, BS 4 208 and BS 5 210.

Each of the ranging response message includes not only the time synchronization information but also the information of hop count and certificate profile. As shown in FIG. 2, the hop count information (including hop1, hop2, hop3, hop4, hop5 and hop6) is defined corresponding to the number of BSs through which the time synchronization information, included in the GPS signal provided by the GPS transmitter 200, has passed. Specifically, BS 1 202 transmits hop count information (hop1) representing a hop count having a value of '1' to BS 2 204 because the time synchronization information included in the GPS signal has passed through one BS when it reaches BS 2 204. In this way, BS 2 204 transmits hop count information (hop2) representing a hop count having a value of '2' to BS 3 206, and BS 3 206 transmits hop count information (hop3) representing a hop count having a value of '3' to BS 4 208 and hop count information (hop4) representing a hop count having a value of '4' to BS 2 204. As described above, the hop count information (including hop1, hop2, hop3, hop4, hop5 and hop6) is defined corresponding to the number of BSs through which the time synchronization information, which each BS transmits to neighbor BSs, has passed. The more BSs there are through which the time synchronization information has passed, the larger the hop count is.

Hereinafter, an operation of acquiring time synchronization by BS 5 210 (as an example of BSs 204, 206, 208 and 210 which do not have the GPS receiver) will be described. The following description is based on an assumption that all the BSs 202, 204, 206, 208 and 212 but BS 5 210 have already acquired the time synchronization.

After scanning neighbor BSs, BS 5 210 requests time synchronization information from the scanned neighbor BSs (BS 4 208 and BS 6 212), in order to acquire time synchronization. Specifically, BS 5 210 transmits a ranging request message to the neighbor BSs 208 and 212, and the neighbor BSs 208 and 212 transmit a ranging response message to BS 5 210 in response to the ranging request message. Because BS 6 212 is equipped with a GPS receiver, BS 6 212 acquires time synchronization by receiving time synchronization information directly from the GPS transmitter 200. BS 4 208 acquires time synchronization by receiving time synchronization information from BS 3, which has already acquired time synchronization. Then, BS 6 212 transmits a ranging response message including time synchronization information, hop count information (hop1) and certificate profile to BS 5 210. BS 4 208 also transmits a ranging response message including time synchronization information, hop count information (hop4) and certificate profile to BS 5 210. Then, BS 5 210 determines from the certificate profiles included in the ranging response messages if the time synchronization information is available and compares the hop count information (hop1 & hop4) included in ranging response messages when the time synchronization information is available. As a result of the comparison, BS 5 210 selects BS 6 212 which sent the ranging response message including the smaller hop count information (hop1). Thereafter, BS 5 210 performs time synchronization with the selected BS 6 212, thereby acquiring the time synchronization. Therefore, BS 5 210 can acquire more exact time synchronization because it performs time synchronization with BS 6 212 which sent the ranging response message including the smaller hop count value.

Hereinafter, a process in which one of the BSs 202, 204, 206, 208 and 210 having no GPS receiver in FIG. 2 acquires time synchronization from another BS which has already acquired time synchronization will be described in detail with reference to the signal flow diagram of FIG. 3.

The following description is based on an assumption that BS 1 202 and BS 6 212, having a GPS receiver, have already acquired time synchronization by receiving the GPS signal directly from the GPS transmitter 200 and that BS 3 206, BS 4 208 and BS 5 210 also have already acquired the time synchronization from BS 6 212. Hereinafter, a process in which BS 2 204 acquires time synchronization and then BS 3 206 acquires time synchronization at a predetermined time synchronization period will be described. According to the above assumption, in FIG. 3, BS 1 202 is equipped with a GPS receiver and has already acquired time synchronization by the GPS receiver, BS 2 204, BS 3 206 and BS 4 208 are not equipped with a GPS receiver, and BS 3 206 and BS 4 208 except for BS 2 204 have already acquired time synchronization by using the time synchronization information transmitted from neighbor BSs.

Figure 3:
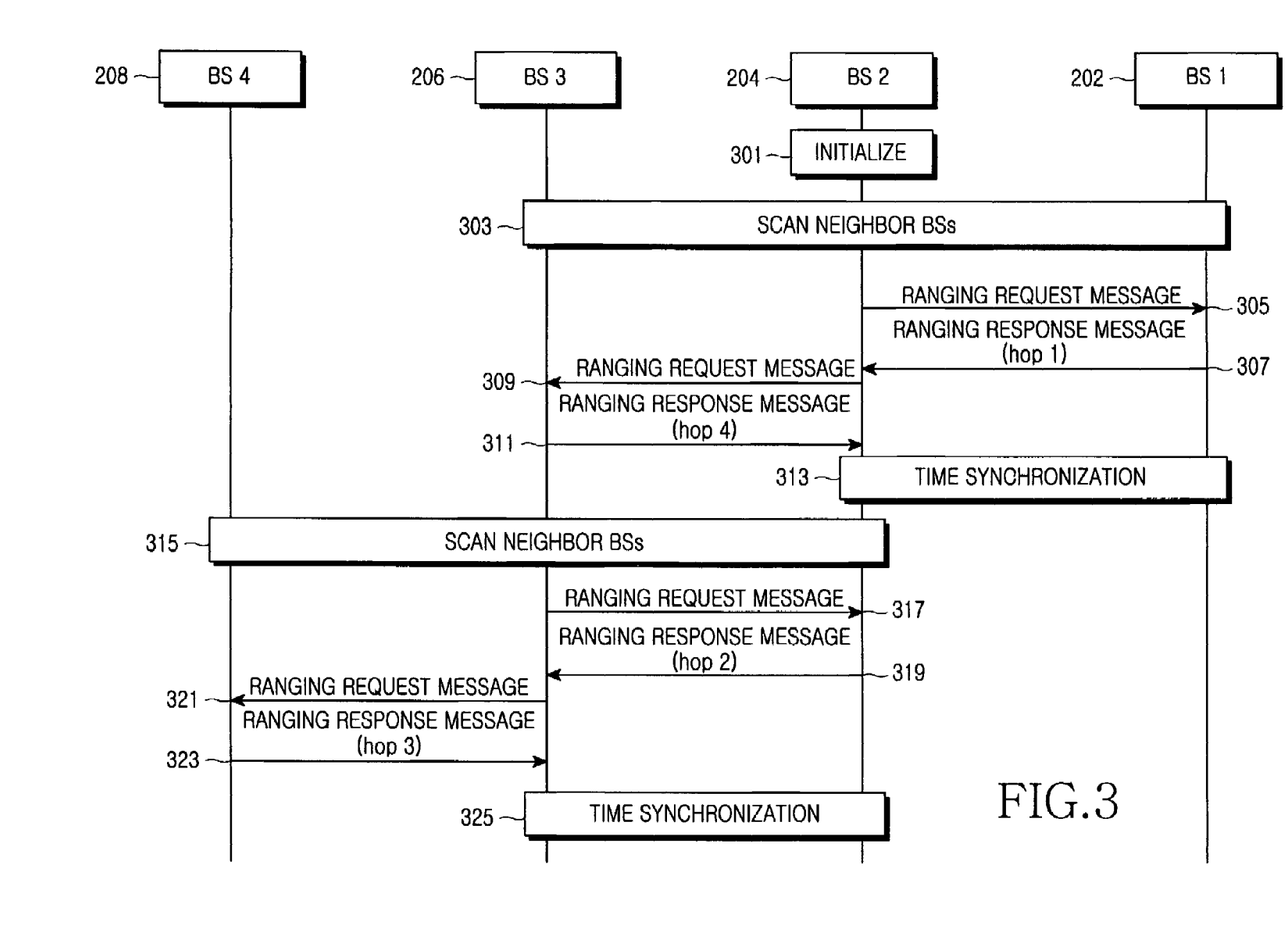
FIG. 3 is a signal flow diagram for acquisition of time synchronization between BSs in a BWA communication system according to an embodiment of the present invention.

Referring to FIG. 3, BS 2 204 is turned on and performs initialization (step 301) and then scans neighbor BSs (step 303). Here, it is assumed that BS 2 204 has found only BS 1 202 and BS 3 206 as its own neighbor BSs through the scanning.

After recognizing the neighbor BSs, BS 2 204 transmits a ranging request message for requesting time synchronization to the neighbor BSs, i.e. BS 1 202 and BS 3 206 (steps 305 and 309). The ranging request message transmitted from BS 2 204 to BS 1 202 and BS 3 206 includes the time synchronization hop report request information shown in Table 1 as described above. In response to the ranging request message, each of BS 1 202 and BS 3 206 transmits a ranging response message to BS 2 204 (steps 307 and 311). Specifically, the ranging response message transmitted from each of BS 1 202 and BS 3 206 to BS 2 204 includes the time synchronization hop report response information shown in Table 2 having hop count information corresponding to the time synchronization hop report request information included in the ranging request message, the certificate profile of Table 3 and time synchronization information. In FIG. 3, BS 2 204 transmits the ranging request message sequentially to BS 1 202 and BS 3 206, and BS 1 202 and BS 3 206 also sequentially transmit the ranging response messages to BS 2 204. However, BS 2 204 may transmit the ranging request message simultaneously to BS 1 202 and BS 3 206 and may simultaneously receive the ranging response messages from BS 1 202 and BS 3 206.

Specifically, in step 307, BS 1 202, which has already acquired time synchronization by receiving time synchronization information directly from the GPS transmitter 200, transmits a ranging response message including its own time synchronization information, a hop count information(hop1) and a certificate profile to BS 2 204. The hop count information(hop1) represent a hop count included in the ranging response message sent by BS 1 202 has a value of '1' because the time synchronization information has passed through only BS 1 202 when it is transmitted from BS 1 202 to BS 2 204. Then, in step 311, BS 3 206 having already acquired time synchronization from the time synchronization information transmitted from BS 4 208 transmits a ranging response message including its own time synchronization information, a hop count information(hop4) and a certificate profile to BS 2 204. The hop count information(hop4) represent a hop count included in the ranging response message sent by BS 3 206 has a value of '4' which is obtained by adding '1' to the hop count ('3') of the BS 4 208.

After receiving the ranging response messages from BS 1 202 and BS 3 206, BS 2 204 determines if the certificate profiles included in the ranging response messages are available, that is, if the time synchronization information received from BS 1 202 and BS 3 206 is available. When the certificate profiles request message, the certificate protocol information and time synchronization information.

Specifically, in step 319, BS 2 204, which has already acquired time synchronization from BS 1 202, transmits a ranging response message including its own time synchronization information, a hop count information and a certificate profile to BS 3 206. The hop count information(hop2) represent a hop count included in the ranging response message sent by BS 2 204 has a value of '2' which is obtained by adding '1' to the hop count ('1') of the BS 1 202. Then, in step 323, BS 4 208 having already acquired time synchronization from the time synchronization information transmitted from BS 5 210 transmits a ranging response message including its own time synchronization information, a hop count information and a certificate profile to BS 3 206. The hop count information(hop3) represent a hop count included in the ranging response message sent by BS 4 208 has a value of '3' which is obtained by adding '1' to the hop count ('2') of the BS 5 210.

After receiving the ranging response messages, BS 3 206 determines if the certificate profiles included in the ranging response messages are available, that is, if the time synchronization information received from BS 1 202 and BS 3 206 is available. When the certificate profiles are available, BS 3 206 compares the hop counts included in the two ranging response messages and performs time synchronization with the BS having the smaller hop count value. The hop count information (hop2) transmitted from BS 2 204 has a value of '2' and the hop count information (hop3) transmitted from BS 4 208 has a value of '3'. Therefore, BS 3 206 performs time synchronization with BS 2 204 having the smaller hop count value (step 325). That is, BS 3 206 acquires time synchronization from the time synchronization information of BS 2 204.

In order to periodically perform time synchronization at a predetermined time synchronization period, the BS which has already acquired time synchronization acquires time synchronization scans and selects again a BS having the smallest hop count from among the neighbor BSs including the counterpart BS with which the BS previously performed time synchronization.

Figure 4:
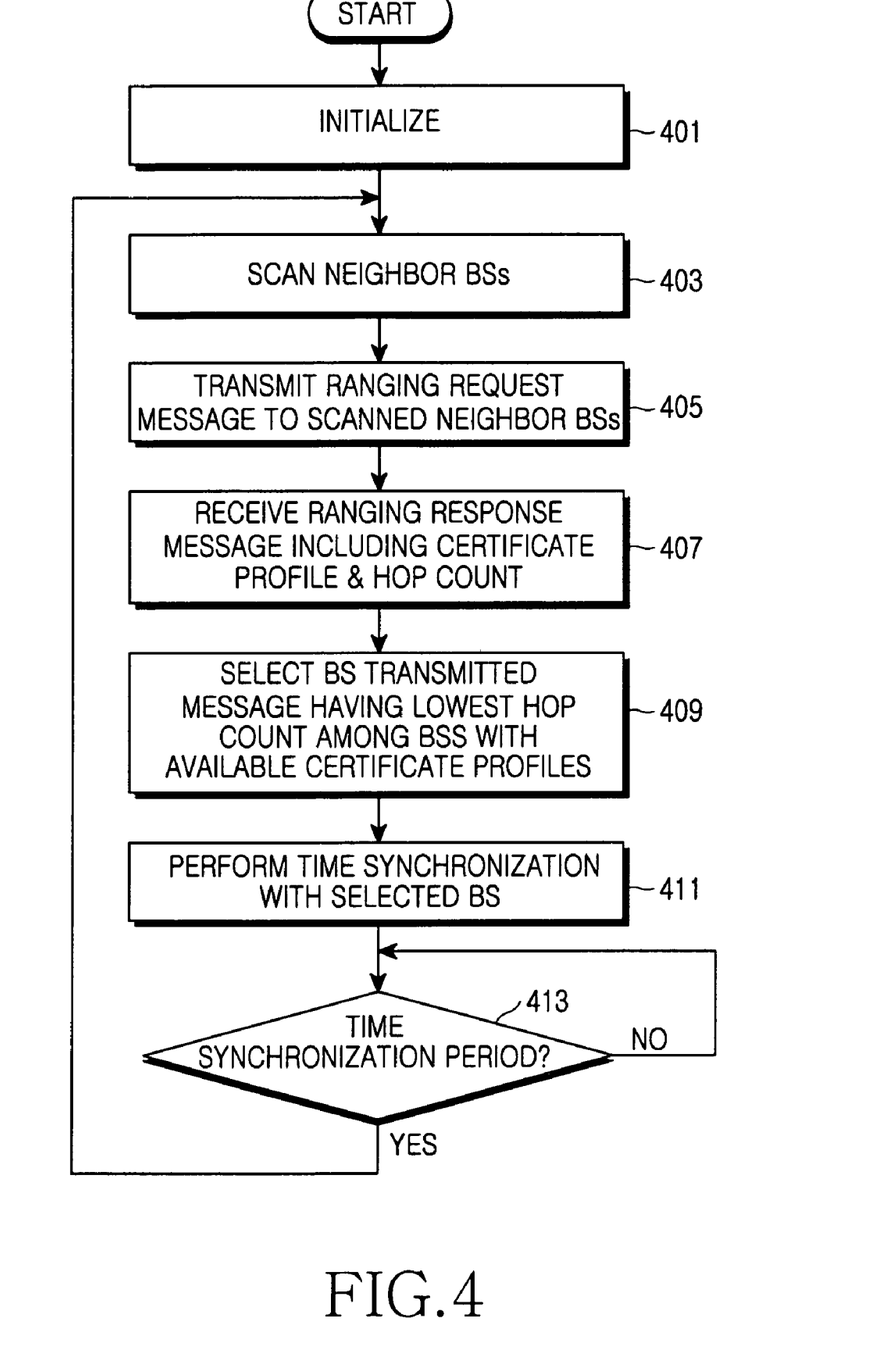
FIG. 4 is a flowchart of a process in which a BS acquires time synchronization in a BWA communication system according to an embodiment of the present invention.

Hereinafter, a process in which a BS, having no GPS receiver and requiring acquisition of time synchronization, acquires time synchronization will be described with reference to the flowchart of FIG. 4, which is a process in which a BS acquires time synchronization in a BWA communication system according to an embodiment of the present invention.

In step 401, the BS is turned on and performs initialization. In step 403, the BS scans neighbor BSs in order to acquire time synchronization. When neighbor BSs are found through the scanning, the BS transmits a ranging request message to the found neighbor BSs. The transmitted ranging request message includes time synchronization hop report request information.

Then, the neighbor BSs transmit ranging response messages to the BS in response to the ranging request message transmitted from the BS. As a result, in step 407, the BS receives the ranging response messages. Each of the ranging response messages includes time synchronization information, hop count information and certificate profile information. Next, in step 409, the BS determines if the certificate profile information included in the ranging response messages is available and then compares the hop count values in the ranging response messages including available certificate profile information. That is, the BS compares the hop count values included in the ranging response messages transmitted from neighbor BSs and selects a BS transmitted the smallest hop count value.

In step 411, the BS performs time synchronization with the selected neighbor BS. When it becomes the predetermined time period (step 413), the BS returns to step 403. Then, the BS scans neighbor BSs again and repeats the above process, so as to periodically perform time synchronization, thereby acquiring time synchronization at the predetermined time period.

Hereinafter, a process in which a neighbor BS having received a ranging request message from a BS requiring acquisition of time synchronization transmits a ranging response message to the BS, that is, a process for providing time synchronization information from the neighbor BS to the BS, will be described with reference to the flowchart of FIG. 5.

Figure 5:
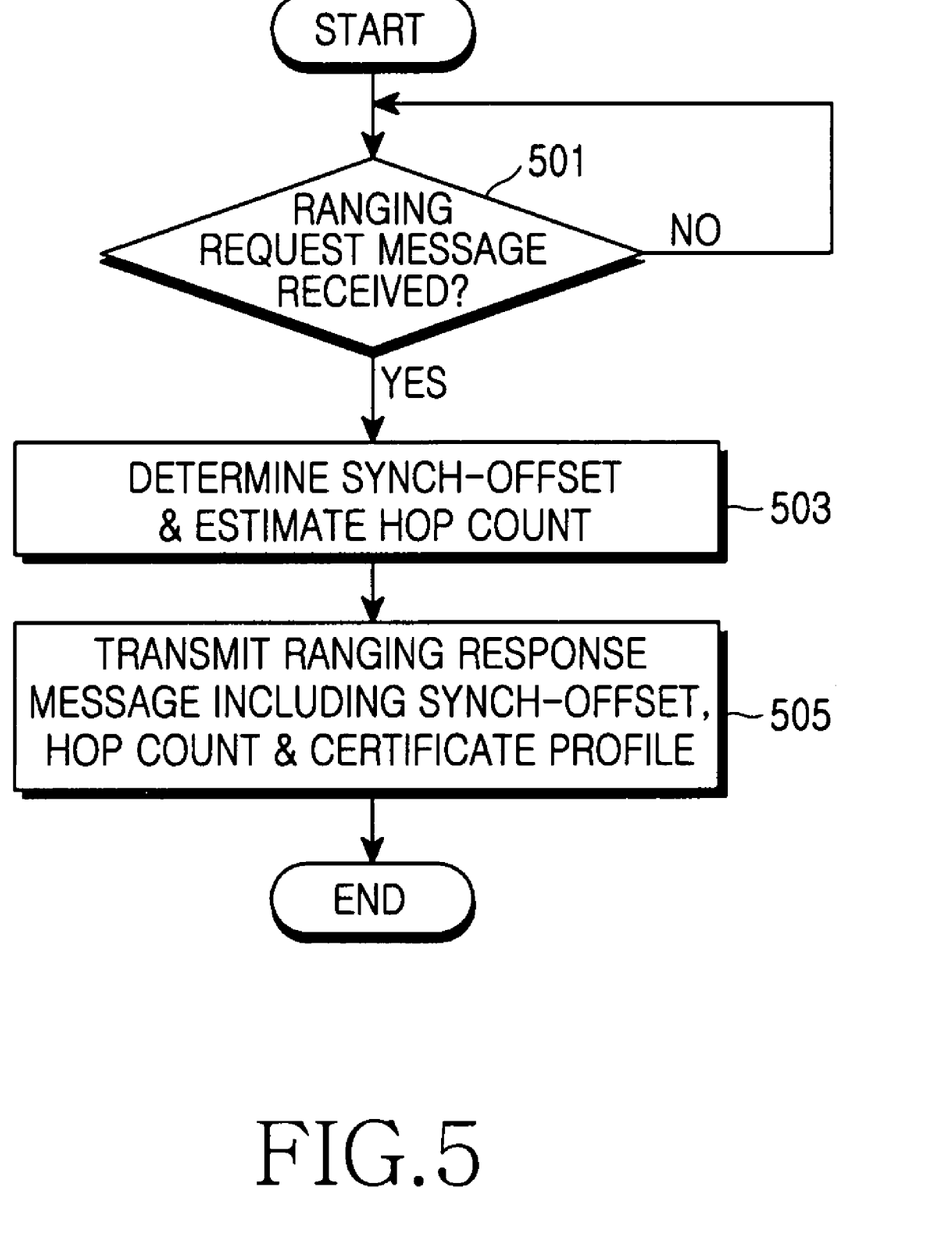
FIG. 5 is a flowchart of an operation process of a neighbor BS having received a ranging request message from a BS requiring acquisition of time synchronization according to an embodiment of the present invention.

Referring to FIG. 5, upon receiving a ranging request message from a BS requiring acquisition of time synchronization in step 501, the neighbor BS proceeds to step 503. In step 503, in response to the ranging request message, the neighbor BS determines the degree of update of the time synchronization information, i.e., the degree of update of the inner clock (Synch_Offset) and calculates the hop count. Description about the degree of update of the inner clock will be omitted here because it can be determined in the same way as in a usual process for updating time. Thereafter, in step 505, the neighbor BS transmits a ranging response message including the determined degree of update of the inner clock (corresponding to its own time synchronization information), hop count information representing the calculated hop count value and certificate profile information to the BS transmitted the ranging request message.

According to the present invention as described above, a BS requiring acquisition of time synchronization may receive available time synchronization information from another BS having already acquired time synchronization and can acquire time synchronization from the received information. Therefore, the present invention can improve the reliability of the time synchronization. Further, according to the present invention, a BS requiring acquisition of time synchronization can acquire time synchronization by using time synchronization information having the least transmission delay, so that the BS can acquire more precise time synchronization.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for acquiring time synchronization by a first base station in a broadband wireless access communication system including a plurality of base stations which include certain base stations having already acquired time synchronization and a first base station requiring acquisition of time synchronization, the method comprising the steps of:

scanning neighbor base stations around the first base station and requesting time synchronization information from the scanned neighbor base stations by the first base station;

receiving responses from predetermined neighbor base stations having already acquired time synchronization from among the neighbor base stations, the responses including time synchronization information of the predetermined neighbor base stations; and selecting a second base station from among the predetermined neighbor base stations and acquiring time synchronization based on the time synchronization information of the second base station; and rescanning neighbor base stations around the first base station at a predetermined time period and requesting time synchronization information from the rescanned neighbor base stations by the first base station, wherein the time synchronization information is information which indicates a current time point and serves as a reference when other BSs acquire the time synchronization.

2. The method as claimed in claim 1, wherein, in the receiving step, each of the responses includes the time synchronization information, passed base station information and certificate information.

3. The method as claimed in claim 2, wherein the passed base station information represents the number of base stations through which the time synchronization information has passed before reaching the first base station.

4. The method as claimed in claim 2, wherein the certificate information is used when the first base station determines if the time synchronization information is available.

5. The method as claimed in claim 2, wherein the certificate information is generated by a base station which has initially acquired time synchronization from among the certain base stations.

6. The method as claimed in claim 2, wherein, in the selecting step, the first base station compares the passed base station information of the responses and selects a base station transmitting passed base station information representing a minimum number of base stations through which the time synchronization information passed as the second base station.

7. The method as claimed in claim 1, wherein, in the requesting step, the first base station requests passed base station information in addition to the time synchronization information, the passed base station information representing the number of base stations through which the time synchronization information has passed before reaching the first base station.

8. The method as claimed in claim 1, wherein, in the acquiring step, the first base station acquires the time synchronization by updating an inner clock of the first base station based on the time synchronization information of the selected second base station.

9. A method for supporting acquisition of time synchronization of a first base station by a second base station in a broadband wireless access communication system including a plurality of base stations which include certain base stations having already acquired time synchronization and the first base station requiring acquisition of time synchronization, the second base station being one of the certain base stations and located adjacently to the first base station, the method comprising the steps of:

receiving a time synchronization information request message from the first base station by the second base station; and transmitting a response message including time synchronization information of the second base station to the first base station in response to the time synchronization information request message, so that the first base station can acquire time synchronization with the second base station, wherein the time synchronization information is information which indicates a current time point and serves as a reference when other BSs acquire the time synchronization, and wherein the time synchronization information request message is received at a predetermined period by the second base station.

10. The method as claimed in claim 9, wherein the response message includes the time synchronization information, passed base station information and certificate information.

11. The method as claimed in claim 10, wherein the passed base station information represents the number of base stations through which the time synchronization information has passed before reaching the first base station.

12. The method as claimed in claim 10, wherein, in the transmitting step, the second base station adds one to a value of the passed base station information already received by the second base station, inserts passed base station information with the added value into the response message, and then transmits the response message.

13. The method as claimed in claim 10, wherein the certificate information is used when the first base station determines if the time synchronization information is available.

14. The method as claimed in claim 10, wherein the certificate information is generated by a base station which has initially acquired time synchronization from among the certain base stations.

15. The method as claimed in claim 9, wherein the time synchronization information request message received by the second base station from the first base station includes a request for the passed base station information representing the number of base stations through which the time synchronization information has passed before reaching the first base station.

16. A system for acquiring time synchronization by a first base station in a broadband wireless access communication system including a plurality of base stations which include certain base stations having already acquired time synchronization and the first base station requiring acquisition of time synchronization, the system comprising:

the first base station for scanning neighbor base stations around the first base station, requesting time synchronization information from the scanned neighbor base stations, receiving responses from predetermined neighbor base stations having already acquired time synchronization from among the neighbor base stations, selecting a second base station from among the predetermined neighbor base stations, and acquiring time synchronization based on the time synchronization information of the second base station, the responses including time synchronization information of the predetermined neighbor base stations; and the second base station for, in response to the request for the time synchronization information from the first base station, transmitting a response message including time synchronization information of the second base station to the first base station, so that the first base station can acquire time synchronization with the second base station, wherein the time synchronization information is information which indicates a current time point and serves as a reference when other BSs acquire the time synchronization,and wherein the first base station rescans neighbor base stations around the first base station at a predetermined time period and requests time synchronization information to the rescanned neighbor base stations.

17. The system as claimed in claim 16, wherein the response transmitted by the second base station includes the time synchronization information, passed base station information and certificate information.

18. The system as claimed in claim 17, wherein the passed base station information represents the number of base stations through which the time synchronization information has passed before reaching the first base station.

19. The system as claimed in claim 17, wherein the certificate information is used when the first base station determines if the time synchronization information is available.

20. The system as claimed in claim 17, wherein the certificate information is generated by a base station which has initially acquired time synchronization from among the certain base stations.

21. The system as claimed in claim 17, wherein the first base station compares the passed base station information of the responses and selects a base station transmitting passed base station information representing a minimum number of base stations through which the time synchronization information passed as the second base station.

22. The system as claimed in claim 17, wherein the second base station adds one to a value of the passed base station information already received by the second base station, inserts passed base station information with the added value into the response message, and then transmits the response message.

23. The system as claimed in claim 16, wherein the first base station requests passed base station information in addition to the time synchronization information, the passed base station information representing the number of base stations through which the time synchronization information has passed before reaching the first base station.

24. The system as claimed in claim 16, wherein the first base station acquires the time synchronization by updating an inner clock of the first base station based on the time synchronization information of the selected second base station.

* * * * *